(12) United States Patent
Zheng et al.

(10) Patent No.: US 12,495,100 B2
(45) Date of Patent: Dec. 9, 2025

(54) DATA PREHEATING IN CONTENT DELIVERY NETWORK

(71) Applicant: Beijing Volcano Engine Technology Co., Ltd., Beijing (CN)

(72) Inventors: Yousheng Zheng, Beijing (CN); Yuling Zhang, Beijing (CN); Jian Wang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 19/072,124

(22) Filed: Mar. 6, 2025

(65) Prior Publication Data
US 2025/0301053 A1 Sep. 25, 2025

(30) Foreign Application Priority Data
Mar. 21, 2024 (CN) .......................... 202410330208.3

(51) Int. Cl.
*H04L 67/5681* (2022.01)
(52) U.S. Cl.
CPC ................................ *H04L 67/5681* (2022.05)
(58) Field of Classification Search
None
See application file for complete search history.

(56) References Cited

U.S. PATENT DOCUMENTS

| | | | | |
|---|---|---|---|---|
| 6,182,122 B1 * | 1/2001 | Berstis | .................... | H04L 69/04 |
| | | | | 709/219 |
| 7,088,545 B1 * | 8/2006 | Singh | ................... | G11B 5/5547 |
| 8,521,959 B2 * | 8/2013 | Zhang | ................. | G06F 12/0866 |
| | | | | 711/117 |
| 8,797,334 B2 * | 8/2014 | Costa | .................... | G06F 9/4411 |
| | | | | 345/503 |
| 8,819,187 B1 * | 8/2014 | Hofmann | ................ | H04L 65/80 |
| | | | | 709/219 |

(Continued)

FOREIGN PATENT DOCUMENTS

| CN | 110661862 A | 1/2020 |
|---|---|---|
| CN | 109218632 B | 11/2020 |

(Continued)

OTHER PUBLICATIONS

Chinese Patent Application No. 202410330208.3; Office Action dated May 8, 2024, 26 pages with machine translation.

(Continued)

*Primary Examiner* — Backhean Tiv
(74) *Attorney, Agent, or Firm* — BakerHostetler

(57) ABSTRACT

Embodiments of the disclosure provide a data preheating method and apparatus used in a content delivery network (CDN), a device, and a medium. The method includes: receiving a resource request from a service, where the resource request includes a network link corresponding to target data to be preheated of the service; determining, based on a domain name in the network link, an Internet protocol (IP) address set for the network link from a mapping table of respective regions and IP segments in a global network range of the CDN; determining, based on the IP address set, a set of service nodes for preheating in the CDN; and executing, in respective service nodes in the set of service nodes, a preheating task for the target data.

20 Claims, 7 Drawing Sheets

(56) References Cited

U.S. PATENT DOCUMENTS

| | | | | |
|---|---|---|---|---|
| 8,886,742 B2* | 11/2014 | Crowe | | H04L 67/5681 709/216 |
| 9,063,861 B1* | 6/2015 | Derbeko | | G06F 12/0868 |
| 9,224,423 B1* | 12/2015 | Seo | | G11B 20/1217 |
| 9,225,794 B2* | 12/2015 | Roskind | | G06F 16/95 |
| 9,578,077 B2* | 2/2017 | Roverso | | H04L 67/1068 |
| 9,798,827 B2* | 10/2017 | Liang | | G06F 40/123 |
| 10,117,058 B2* | 10/2018 | Begeja | | H04L 67/60 |
| 10,360,159 B1* | 7/2019 | Black | | G06F 12/128 |
| 10,375,047 B2* | 8/2019 | Leblond | | H04L 12/2816 |
| 10,440,140 B2* | 10/2019 | Barraclough | | H04L 67/5681 |
| 10,630,530 B2* | 4/2020 | Yang | | H04L 67/5682 |
| 10,642,822 B2* | 5/2020 | Xiao | | G06F 16/27 |
| 10,721,322 B2* | 7/2020 | Patil | | H04L 65/612 |
| 11,057,489 B2* | 7/2021 | Xie | | H04L 67/63 |
| 11,451,603 B2* | 9/2022 | Grubb | | H04N 21/845 |
| 11,487,670 B2* | 11/2022 | Dubey | | G06N 20/00 |
| 11,496,809 B2* | 11/2022 | Li | | H04N 21/23103 |
| 12,130,831 B2* | 10/2024 | Zhan | | G06F 16/172 |
| 12,223,983 B1* | 2/2025 | Popov | | G11B 5/012 |
| 12,316,717 B2* | 5/2025 | Zheng | | H04L 61/5007 |
| 2008/0126751 A1* | 5/2008 | Mizrachi | | G06F 9/485 712/30 |
| 2011/0161461 A1* | 6/2011 | Niven-Jenkins | | H04L 61/5038 709/217 |
| 2020/0045128 A1* | 2/2020 | Xie | | H04L 67/06 |
| 2021/0289040 A1* | 9/2021 | Arsenault | | H04L 65/612 |
| 2022/0329672 A1* | 10/2022 | Lv | | H04L 67/60 |
| 2023/0030265 A1* | 2/2023 | Fang | | G06N 3/08 |
| 2023/0394307 A1* | 12/2023 | Zhu | | G06N 3/08 |
| 2025/0039276 A1* | 1/2025 | Zheng | | H04L 67/52 |

FOREIGN PATENT DOCUMENTS

| | | |
|---|---|---|
| CN | 113784170 A | 12/2021 |
| CN | 114153594 A | 3/2022 |
| CN | 116016546 A | 4/2023 |
| CN | 116846868 A | 10/2023 |
| CN | 117938955 A | 4/2024 |

OTHER PUBLICATIONS

Chinese Patent Application No. 202410330208.3; Notice of Allowance dated May 27, 2024, 11 pages with machine translation.

International Patent Application No. PCT/CN2025/077698; International Search Report dated May 19, 2025, 5 pages with machine translation.

European Patent Application No. 25161841.9; Extended European Search Report dated Oct. 29, 2025, 10 pages.

Krishnamurthy, et al., "On the Use and Performance of Content Distribution Networks," Proceedings of the 1st Acm Sigcomm Workshop on Internet Measurement, Nov. 1, 2001, pp. 169-182.

Zhao, et al., "Mobility Prediction-Assisted Over-the-Top Edge Prefetching for Hierarchical VANETs," IEEE Journal on Selected Areas in Communications, Aug. 2018, vol. 36, No. 8, pp. 1786-1801.

* cited by examiner

DATA PREHEATING IN CONTENT DELIVERY NETWORK

CROSS-REFERENCE

The present application claims priority to Chinese Patent Application No. 202410330208.3, filed on Mar. 21, 2024, and entitled "METHOD, APPARATUS, DEVICE, AND MEDIUM FOR DATA PREHEATING USED IN CDN", the entirety of which is incorporated herein by reference.

FIELD

Example embodiments of the present disclosure generally relate to the field of computers, and in particular, to data preheating in a content delivery network (CDN).

BACKGROUND

With the development of Internet technologies, personal users have an increasing demand for accessing a large amount of resources. A content delivery network (CDN) preheating technology allows caching a corresponding resource of a source station on a CDN node before a user requests the resource for the first time. In this way, when the user actually accesses the resource, the user can directly obtain the latest and cached data from the CDN node, which is efficient and fast. The CDN can allow a user to access required content locally, thereby solving network congestion and improving the response speed for user access to websites.

SUMMARY

In a first aspect of the present disclosure, a data preheating method used in a content delivery network (CDN) is provided. The method includes: receiving a resource request from a service, where the resource request includes a network link corresponding to target data to be preheated of the service; determining, based on a domain name in the network link, an Internet protocol (IP) address set for the network link from a mapping table of respective regions and IP segments in a global network range of the CDN; determining, based on the IP address set, a set of service nodes for preheating in the CDN; and executing, in respective service nodes in the set of service nodes, a preheating task for the target data.

In a second aspect of the present disclosure, a data preheating apparatus used in a content delivery network CDN is provided. The apparatus includes: a request receiving module configured to receive a resource request from a service, where the resource request includes a network link corresponding to target data to be preheated of the service; an address determination module configured to determine, based on a domain name in the network link, an Internet protocol (IP) address set for the network link from a mapping table of respective regions and IP segments in a global network range of the CDN; a node determination module configured to determine, based on the IP address set, a set of service nodes for preheating in the CDN; and a task execution module configured to execute, in respective service nodes in the set of service nodes, a preheating task for the target data.

In a third aspect of the present disclosure, an electronic device is provided. The electronic device includes at least one processing unit; and at least one memory coupled to the at least one processing unit and storing instructions executable by the at least one processing unit, where the instructions, when executed by the at least one processing unit, cause the electronic device to perform the method in the first aspect of the present disclosure.

In a fourth aspect of the present disclosure, a computer-readable storage medium is provided. The computer-readable storage medium has a computer program stored thereon. The computer program is executable by a processor to perform the method in the first aspect of the present disclosure.

It should be understood that the content described in the Summary section is not intended to limit the key features or important features of the embodiments of the present disclosure, nor is it intended to limit the scope of the present disclosure. Other features of the present disclosure will be readily understood from the following description.

BRIEF DESCRIPTION OF THE DRAWINGS

Hereinafter, the above and other features, advantages, and aspects of various implementations of the present disclosure will become more apparent with reference to the drawings and the following detailed description. In the drawings, the same or similar reference numerals denote the same or similar elements, where.

DETAILED DESCRIPTION

Figure 1:
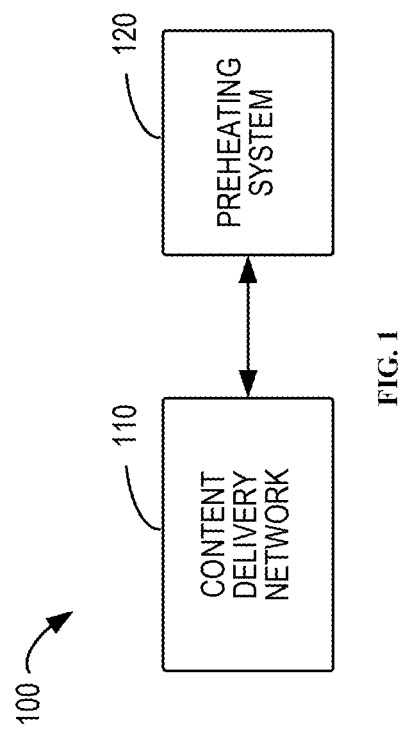
FIG. 1 is a schematic diagram of an example environment in which an embodiment of the present disclosure can be implemented.

Embodiments of the present disclosure will be described in more detail below with reference to the drawings. Although some embodiments of the present disclosure are shown in the drawings, it should be understood that the present disclosure may be implemented in various forms and should not be construed as being limited to the embodiments set forth herein. Rather, these embodiments are provided for a more thorough and complete understanding of the present disclosure. It should be understood that the drawings and embodiments of the present disclosure are only for exemplary purposes, and are not intended to limit the protection scope of the present disclosure.

In the description of the embodiments of the present disclosure, the term "include/comprise" and similar terms should be understood as open inclusion, that is, "include/ comprise but not limited to". The term "based on" should be understood as "at least partially based on". The term "one embodiment" or "the embodiment" should be understood as "at least one embodiment". The term "some embodiments"

should be understood as "at least some embodiments". Other explicit and implicit definitions may also be included below.

In this document, unless otherwise specified, performing a step "in response to A" does not mean that the step is performed immediately after "A", but may include one or more intermediate steps.

It can be understood that the data involved in the technical solutions (including but not limited to the data itself, the acquisition, use, storage, or deletion of the data) should comply with the requirements of corresponding laws, regulations, and related provisions.

It can be understood that before using the technical solutions disclosed in the embodiments of the present disclosure, relevant users should be informed of the type, scope of use, use scenarios, and the like of the information involved in the present disclosure in an appropriate manner and their authorization should be obtained according to relevant laws and regulations, where the relevant users may include any type of rights holder, such as an individual, an enterprise, or a group.

For example, in response to receiving an active request from a user, prompt information is sent to a relevant user to explicitly prompt the relevant user that the operation requested to be performed will require the acquisition and use of information of the relevant user, so that the relevant user can independently select, according to the prompt information, whether to provide information to software or hardware such as an electronic device, an application, a server, or a storage medium that performs the operation of the technical solution of the present disclosure.

As an optional but non-limiting implementation, in response to receiving an active request from a relevant user, the prompt information may be sent to the relevant user in the form of a pop-up window, for example, and the prompt information may be presented in text in the pop-up window. In addition, the pop-up window may further include a selection control for the user to select "agree" or "disagree" to provide information to the electronic device.

It can be understood that the above process of notifying and obtaining user authorization is only illustrative and does not limit the implementations of the present disclosure, and other manners that satisfy relevant laws and regulations may also be applied to the implementations of the present disclosure. The enabling of a digital assistant-related function, the acquired data, the data processing and storage manner, and the like in the embodiments of the present disclosure should be pre-authorized by the user and other rights holders associated with the user, and should comply with the agreements of relevant laws and regulations and agreements and rules between rights holders.

FIG. 1 is a schematic diagram of an example environment 100 in which an embodiment of the present disclosure can be implemented. In the environment 100, a preheating system 120 is configured to control the provision of a resource preheating service in a content delivery network (CDN) 110.

The preheating system 120 may be any type of device with computing power, including a terminal device or a server-side device. The terminal device may be any type of mobile terminal, fixed terminal, or portable terminal, including a mobile phone, a desktop computer, a laptop computer, a notebook computer, a netbook computer, a tablet computer, a media computer, a multimedia tablet, a personal communication system (PCS) device, or any combination thereof, including accessories and peripherals of these devices or any combination thereof.

The server-side device may include, for example, a computing system/server, such as a mainframe, an edge computing node, a computing device in a cloud environment, and so on. The server-side device may be an independent physical server, a server cluster or a distributed system including a plurality of physical servers, or a cloud server that provides basic cloud computing services such as cloud services, cloud databases, cloud computing, cloud functions, cloud storage, network services, cloud communication, middleware services, domain name services, security services, content delivery networks, and big data and artificial intelligence platforms. The server-side device may include, for example, a computing system/server, such as a mainframe, an edge computing node, a computing device in a cloud environment, and so on. In some embodiments, the preheating system 120 may be implemented based on cloud services.

The CDN 110 may include, for example, a computing system/server, such as a mainframe, an edge computing node, a computing device in a cloud environment, and so on. The server-side device may be an independent physical server, a server cluster or a distributed system including a plurality of physical servers, or a cloud server that provides basic cloud computing services such as cloud services, cloud databases, cloud computing, cloud functions, cloud storage, network services, cloud communication, middleware services, domain name services, security services, content delivery networks, and big data and artificial intelligence platforms. The server-side device may include, for example, a computing system/server, such as a mainframe, an edge computing node, a computing device in a cloud environment, and so on. It should be understood that the structure and function of the environment 100 are described for exemplary purposes only, without suggesting any limitation to the scope of the present disclosure.

The CDN preheating technology allows caching a corresponding resource of a source station on a CDN node before a user requests the resource for the first time. In this way, when the user actually accesses the resource, the user can directly obtain the latest and cached data from the CDN node, which is efficient and fast. Due to differences in rooms of respective service nodes of traditional CDN manufacturers, a single manufacturer cannot implement resource preheating acceleration on a global scale, that is, cannot provide a standardized preheating capability, and cannot support preheating at a manufacturer/global/country/region level.

Figure 2:
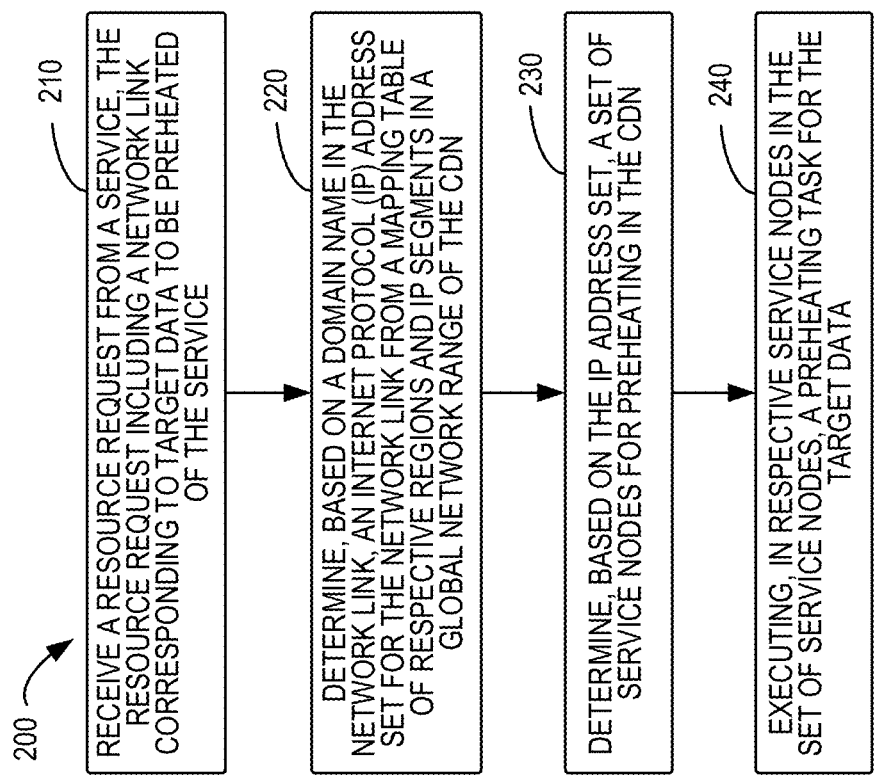
FIG. 2 is a flowchart of a process of data preheating in a CDN according to some embodiments of the present disclosure.

FIG. 2 is a flowchart of a process 200 of data preheating in a CDN according to some embodiments of the present disclosure. The process 200 may be implemented in the preheating system 120 in FIG. 1. For ease of discussion, the process 200 will be described with reference to the environment 100 in FIG. 1.

At block 210, the preheating system 120 receives a resource request from a service, where the resource request includes a network link corresponding to target data to be preheated of the service. The service may be a demander with a large amount of data preheating, for example, an entity such as an institution or an enterprise. Resources may be obtained through a network link (URL, uniform resource location), and each network link has corresponding data content for the service to use.

Preheating through a URL for a resource can reduce the time consumption of returning to the source and improve the user experience. Especially in a case of a large-scale service activity, new content release, or a traffic peak, a situation where a large number of users access the resource at the same time can be effectively handled, and problems that may occur due to a high load on a source station can be avoided.

At block 220, the preheating system 120 determines, based on a domain name in the network link, an Internet protocol (IP) address set for the network link from a mapping table of respective regions and IP segments in a global network range of the CDN 110. In some embodiments, the global network range of the CDN may be a global network range, and the respective regions may cover respective countries or regions around the world. Each country/region around the world has its own IP network segment information, which does not conflict with each other.

At block 230, the preheating system 120 determines, based on the IP address set, a set of service nodes for preheating in the CDN. Each IP address has a corresponding service node. The service node may include an edge node, a data link layer (L2) node, a network layer (L3) node, and the like in the network. In some embodiments, using the edge node as the service node is more advantageous for improving the performance of the preheating system 120.

The embodiments help implement node preheating in the entire region of the CDN or even on a global scale, and there is no need to specify a user and a domain name range, so that the service does not need to distinguish a preheating service provider.

The preheating system 120 may extract all domain names in the URL to obtain a domain name list after deduplication. When determining the IP address set from the mapping table based on the domain name in the network link, the Domain Name System (DNS) may be used. The DNS is a distributed database that maps a domain name and an IP address to each other, which can make it more convenient for people to access the Internet.

In some embodiments, for global preheating, the preheating system 120 may obtain a query result of edge node(s) for IP situation at a dial-up test point in a country, and obtain polling for IP situation in a country/region, to calculate a corresponding coverage result of HttpDNS. In some embodiments, IP network segment information of respective countries may be maintained, and a request may be initiated to the Extended DNS (EDNS) through an actual client IP in a city.

Table 1 below shows an example of an edge IP determined through domain name resolution and polling:

TABLE 1

```
{
  "host": "www.test.com",
  "ttl": 600,
  "cip": "2.2.2.2"
}
```

At block 240, the preheating system 120 executes, in respective service nodes in the set of service nodes, the preheating task for the target data. Specifically, the CDN can direct the target data to a service node closest to the user in real time based on comprehensive information such as network traffic, a connection and a load status of each node, and a distance to and a response time of the user, so that the preheating task is executed on the service node closest to the user.

In some embodiments, the preheating system 120 determining the IP address set for the network link includes: determining an access validity of the network link; and in response to determining that the network link is valid, determining the IP address set for the network link.

Specifically, the access validity of the network link may be verified by performing a HEAD request (a network request for acquiring the meta information of a resource without transmitting actual data content) for the IP. For example, assuming that the obtained IP of the CDN edge node is 2.2.2.2 (as shown in the example in Table 1), the HEAD request may be performed for all IPs in the network segment 2.2.2.1 to 2.2.2.254 using the URL. If a status code '200' can be returned normally, it indicates that the access of the URL is valid. In this case, the corresponding IP may be added to the edge node set of the domain name.

By verifying the access validity of the network link, the correctness of the network link used by the user can be ensured, and the waste of service resources due to obtaining a large number of invalid network links can be avoided. In addition, since for the HEAD request, only response header information is returned and no actual response body is returned, the data volume is small, thereby reducing the service resource consumption in the verification process.

Further, in some embodiments, in response to determining that the network link is invalid, access control information corresponding to the network link is obtained; whether there is an access control configuration for the network link is determined based on the access control information; and prompt information is provided to the service based on a determination of whether there is the access control configuration for the network link. Specifically, after the HEAD request is performed, if a status code 'non-200' is returned (for example, a status code '403' is returned), it indicates that the access of the network link is invalid. At this time, the related access control information may be pulled through a domain name configuration interface to determine whether there is an access control configuration that makes preheating impossible or whether there is an anti-theft chain, thereby determining the reason why the URL cannot be preheated, and providing relevant prompt information to the service. Thus the service can learn the reason, which is convenient for analysis and improvement, thereby improving the preheating success rate subsequently.

Further, in some embodiments, the preheating system 120 determining the IP address set for the network link includes: performing, by using the network link, a network request for respective IP addresses in the IP address set; in response to a first IP address in the IP address set failing to be successfully requested, deleting the first IP address from the IP address set; and in response to a first IP address in the IP address set being successfully requested, keeping the first IP address in the IP address set.

Specifically, after the above HEAD request (that is, the network request) is performed for each IP address in the IP address set, the IP address for which the request is confirmed to be successful (that is, the status code '200' is returned) is kept in the IP address set; and the IP address for which the request is not successful (that is, the status code '200' is not returned) is deleted from the IP address set.

Figure 3:
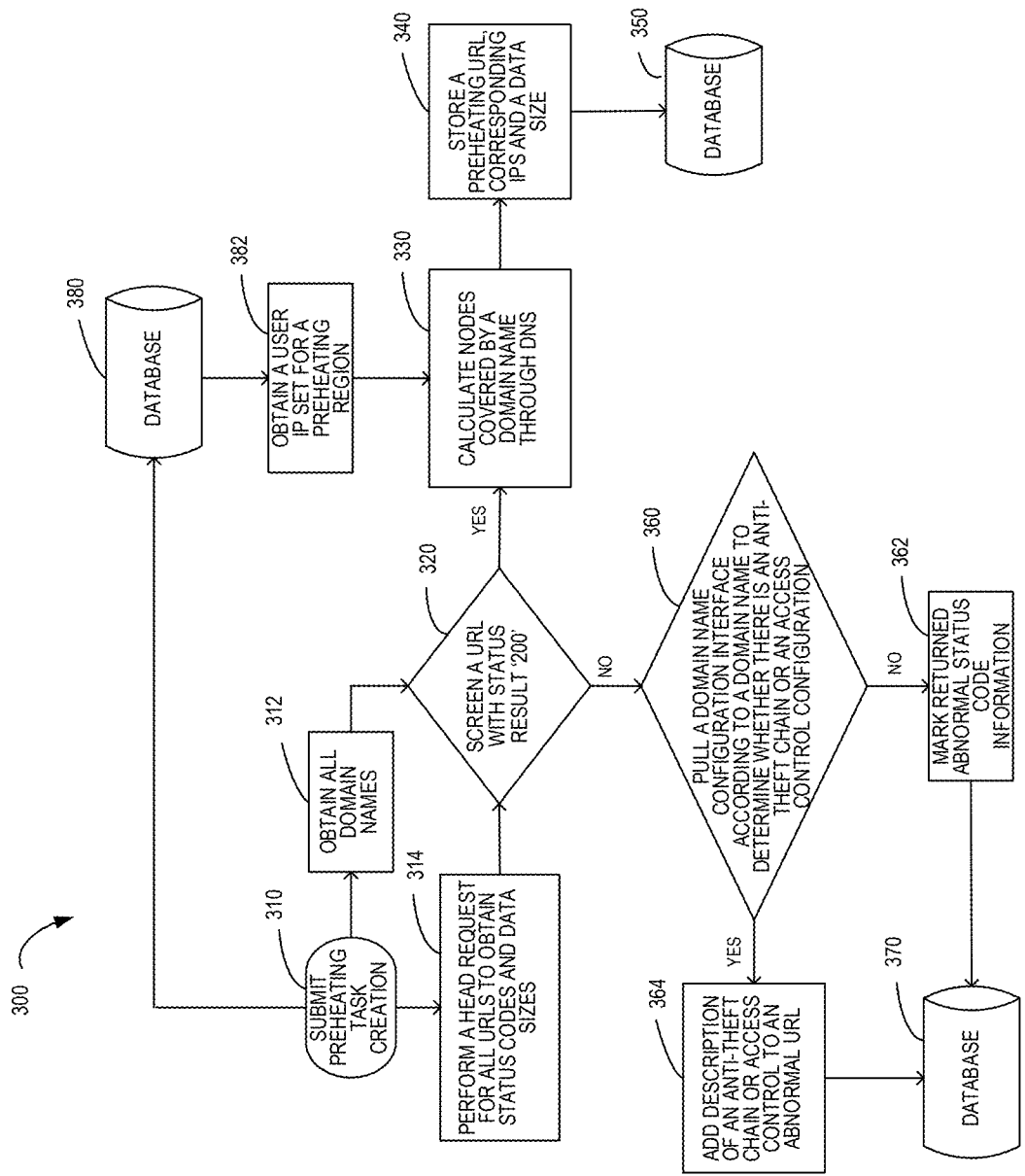
FIG. 3 is a flowchart of a process of determining an edge node for an IP address corresponding to a domain name according to some embodiments of the present disclosure.

FIG. 3 is a flowchart of a process 300 of determining an edge node for an IP address corresponding to a domain name according to some embodiments of the present disclosure. As shown in FIG. 3, the process 300 includes: after submitting preheating task creation (310), obtaining all domain names (312), and obtaining an IP address set of a preheating region (382), then calculating, through the DNS, a service node covered by a domain name (330), then storing a preheating URL, an IP of the corresponding service node, and a size of the target data (340), and storing them in a database 350. The created preheating task may also be stored in a database 380. On the other hand, after obtaining all the domain names (312), for each domain name, a URL with a status of status code '200' is screened (320), so as to obtain a valid URL, and then the valid URL is preheated. In screening of the URL, the status codes and the data sizes of all IP addresses in the URL are obtained by performing the HEAD request (314). If the status of the IP address of the URL is not the status "200", whether there is an anti-theft chain or an access control configuration is determined by pulling a domain name configuration interface according to the domain name (360). If not, the returned abnormal status code information is marked (362) and stored in a database 370; and if yes, description of an anti-theft chain or access control is added to the abnormal URL (364), which is also stored in the database 370.

In some embodiments, the preheating system 120 executing, in the respective service nodes in the set of service nodes, the preheating task for the target data includes: determining a preheating traffic size based on a size of the target data and a number of IPs in the IP address set; and in response to determining that the preheating traffic size does not exceed a traffic threshold, executing, in the respective service nodes in the set of service nodes, the preheating task for the target data. Further, in some embodiments, in response to determining that the preheating traffic size exceeds the traffic threshold, sending traffic prompt information to the service; and in response to receiving a preheating confirmation from the service, executing, in the respective service nodes in the set of service nodes, the preheating task for the target data.

Specifically, the preheating traffic is aggregated traffic based on a domain name. All the URLs under the domain name are traversed to obtain the corresponding IP address set, that is, the number of IPs corresponding to the domain name is determined. By initiating the HEAD request and requesting the URL to obtain the basic attribute, the size of the target data (represented as content-length) can be obtained. The preheating traffic size is obtained by multiplying the size of the target data by the number of IPs (content-length×N).

Further, whether the preheating traffic size exceeds a preset traffic threshold is determined. If it is determined that the preheating traffic size does not exceed the traffic threshold, the preheating task for the target data is executed in the respective service nodes in the set of service nodes. If the preheating traffic size exceeds the traffic threshold, the preheating URL of this domain name may be deleted first in the task, and the traffic prompt information is sent to the service, so that the service confirms whether to continue preheating. If the service confirms preheating, the preheating task for the target data is executed in the respective service nodes in the set of service nodes.

In such embodiments, by calculating, before executing the task, the preheating traffic that may be generated, a situation of a traffic burst caused by an abnormal task can be avoided.

In some embodiments, the preheating system 120 executing, in the respective service nodes in the set of service nodes, the preheating task for the target data includes: creating a plurality of preheating sub-tasks corresponding to the preheating task, where each preheating sub-task corresponds to an IP address in the IP address set, and is configured to execute, at a service node corresponding to the IP address, preheating for the target data; and executing the plurality of preheating sub-tasks.

Figure 4:
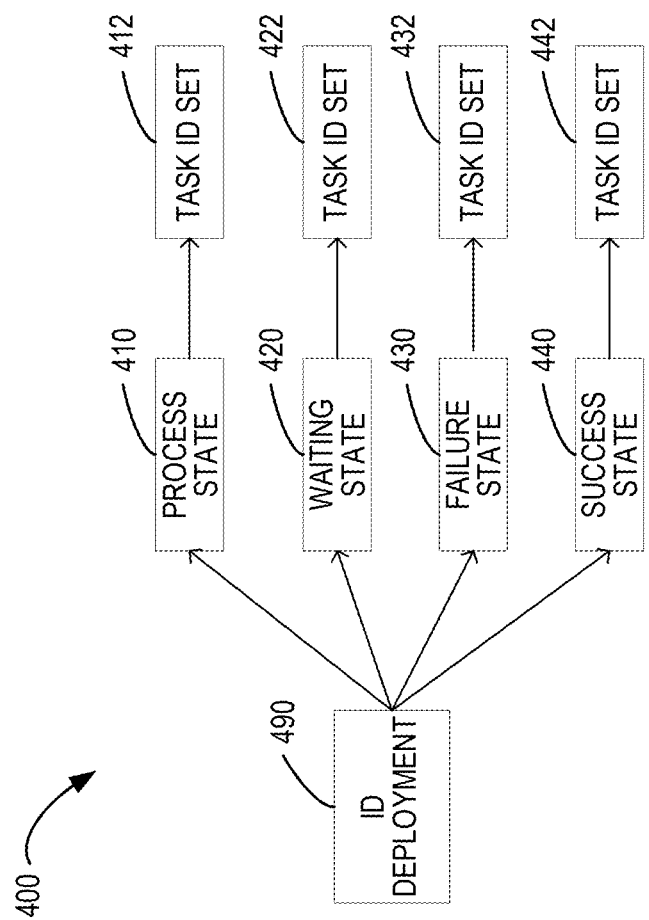
FIG. 4 is an example diagram of creating a preheating task according to some embodiments of the present disclosure.

FIG. 4 is an example diagram of creating a preheating task according to some embodiments of the present disclosure. As shown in FIG. 4, a preheating task 400 may include, for example, a main work order of ID deployment (490), and the plurality of preheating sub-tasks corresponding to it may be a plurality of sub-work orders, which may be, for example, four sub-work orders: a task ID set 412, a task ID set 422, a task ID set 432, and a task ID set 442, respectively. Each sub-work order corresponds to one IP address, and each sub-work order is used to execute preheating for the target data at a service node corresponding to the IP address.

Further, in some embodiments, during the execution of the plurality of preheating sub-tasks, respective execution states corresponding to the plurality of preheating sub-tasks are maintained, where the execution state is selected from a state set including: a process state, a waiting state, a failure state, and a success state; and a state of the preheating task is determined based on the respective execution states corresponding to the plurality of preheating sub-tasks. As shown in FIG. 4, for the sub-task of the task ID set 412, it corresponds to the process state 410; for the sub-task of the task ID set 422, it corresponds to the waiting state 420; for the sub-task of the task ID set 432, it corresponds to the failure state 430; and for the sub-task of the task ID set 442, it corresponds to the success state 440.

Further, each sub-work order may be stored in a database. For example, each sub-work order may be temporarily stored in a REDIS (Remote Dictionary Server) database during its execution, and then periodically synchronized to a persistent database (such as MYSQL). After each sub-work order is completed, it may be stored in a database management system through an MQ (message queue) data channel, and the sub-work order record in the persistent database is deleted.

In some embodiments, the preheating system 120 executing the plurality of preheating sub-tasks includes: for a given preheating sub-task in the preheating sub-tasks, sending a cache request to an IP address corresponding to the given preheating sub-task, to cache the target data at a service node corresponding to the IP address; and in response to completing the caching, setting a state corresponding to the IP address to a cache hit state.

Specifically, the preheating system 120 initiates a request to the IP address in the given sub-task, so that the target data can be cached on the corresponding node to execute preheating. After the request ends, a request for the IP address in the given sub-task is initiated again, and meanwhile the header information of X-Cache (which refers to specifically viewing whether there is a certain web page cache in the service node) is recorded to determine whether there is a hit field. If there is a hit field in the header information, the state corresponding to the IP address is set to the cache hit state (for example, Hit Status may be updated to Hit).

In some embodiments, the preheating system 120 sending the cache request to the IP address corresponding to the given preheating sub-task includes: in response to a size of the target data exceeding a preset threshold, segmenting the target data into a plurality of data segments; and sending a plurality of cache requests in parallel to the IP address corresponding to the given preheating sub-task, where each cache request instructs to cache one data segment of the plurality of data segments to the service node corresponding to the IP address.

Specifically, if the size of the target data exceeds the preset threshold, the target data is segmented and divided into a plurality of data segments (represented as "range"), and each data segment corresponds to one segment request (that is, a cache request). For example, assuming that the size of the target data is 90 MB, it may be divided into two data segments of 0 to 50 MB and 50 MB to 90 MB, and each data segment corresponds to one segment request. Further, the plurality of segment requests corresponding to the plurality of data segments are initiated in parallel, thereby causing the corresponding service node to perform data caching.

In some embodiments, the preheating system 120 sending the cache request to the IP address corresponding to the given preheating sub-task includes: in response to a size of the target data exceeding a preset threshold, segmenting the target data into a plurality of data segments; and performing a plurality of batches of data caching, where in each batch of data caching, a plurality of cache requests are sent in parallel to the IP address corresponding to the given preheating sub-task and an IP address corresponding to at least one other preheating sub-task of the plurality of preheating sub-tasks, and each cache request instructs to cache one data segment of the plurality of data segments to the service node corresponding to the IP address, where in the plurality of batches of data caching, each IP address is cached with different data segments of the plurality of data segments.

Specifically, the plurality of data segments obtained through segmentation may be cached in a plurality of batches. For example, assuming that the size of the target data is 150 MB, it may be divided into three corresponding segment requests. When initiating a task, random edge nodes of different IP network segments may be selected in the same URL for preheating. The first batch of data caching may be: the edge node A with an IP of 1.1.1.1 preheats the data segment of 0 to 50 MB, the edge node B with an IP of 2.2.2.2 preheats the data segment of 50 to 100 MB, and the edge node C with an IP of 3.3.3.3 preheats the data segment of 100 to 150 MB. The second batch of data caching may be: the edge node A with the IP of 1.1.1.1 preheats the data segment of 100 to 150 MB, the edge node B with the IP of 2.2.2.2 preheats the data segment of 0 to 50 MB, and the edge node C with the IP of 3.3.3.3 preheats the data segment of 50 to 100 MB. The third batch of data caching may be: the edge node A with the IP of 1.1.1.1 preheats the data segment of 50 to 100 MB, the edge node B with the IP of 2.2.2.2 preheats the data segment of 100 to 150 MB, and the edge node C with the IP of 3.3.3.3 preheats the data segment of 0 to 50 MB.

With the random acquisition mode for the segments (ranges), only one file is requested from the source station at the same time for all requests, such that the amount of concurrent requests to the source station is effectively controlled.

In addition, in the preheating process of the current batch caching, a mode of merged source returning is used for the L2 and L3 layer nodes. In addition, it is best to select random edge nodes of different IP network segments in the same URL for preheating, so that content positions of the file cached in the L2 layer can be scattered.

Figure 5:
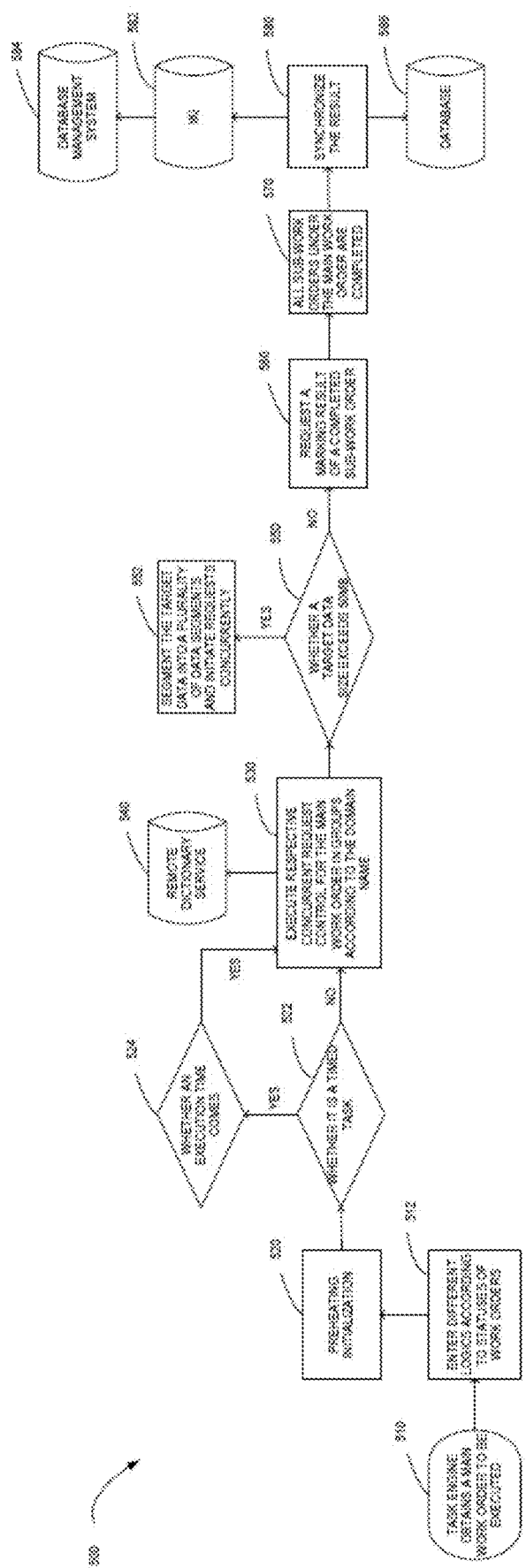
FIG. 5 is a flowchart of a process of preheating task scheduling according to some embodiments of the present disclosure.

FIG. 5 is a flowchart of a process 500 of preheating task scheduling according to some embodiments of the present disclosure. The process 500 may be implemented at the preheating system 120. As shown in FIG. 5, the process 500 includes: after the task engine of the preheating system 120 obtains the main work order to be executed (510), it determines a status of each sub-work order (512). The main work order corresponds to the preheating task, and the sub-work order corresponds to the plurality of preheating sub-tasks divided by the preheating task. If all the sub-tasks are completed, the status of the main work order is updated to a success state, and the sub-task information in REDIS and MYSQL is cleared. If the task of the main work order is in an initialization state (520), the task engine of the preheating system 120 determines whether it is a timed task (522). If it is a timed task, the task engine waits for the execution time, and determines whether the execution time (524) has come. If it is not a timed task, or if the execution time comes, the task engine executes respective concurrent request control for the main work order in groups according to the domain name (530), and uploads the execution result to the remote dictionary server (540). The purpose of supporting the scheduled preheating capability is to perform some special tasks such as a scheduled activity of some services or a scheduled update of an installation package.

Next, the task engine determines whether a target data size (content-length) of the URL exceeds a size (for example, 50 MB or any other size) set for segmentation (550). If yes, the task engine enters a large file preheating mode, including segmenting the target data into a plurality of data segments corresponding to a plurality of segment requests, and initiating and executing the plurality of segment requests concurrently (552); otherwise, the task engine directly preheats the target data. After the direct preheating is completed, the task engine requests a marking result of a completed sub-work order (560). If all sub-work orders under the main work order are completed (570), the task engine synchronizes (580) the sub-work orders to a database (586) and stores them in a database management system (584) through an MQ (message queue) data channel (582). In some embodiments, if a sub-task fails to be executed, the failed sub-task may be retried.

It should be understood that the process 500 is an example implementation of executing the preheating task. In practice, the preheating task for the target data may also be completed through other processes as required.

In another embodiment, data analysis may be performed on work order records, including: extracting an execution rate of a task based on a creation time and a completion time in the work order records, to calculate preheating efficiency; extracting cache hit rate information of a URL if hit situation of the URL is present in the work order records; and calculating quality information of an IP for preheating based on a time consumed for preheating the URL in the work order records, to compare capabilities of different service providers.

Figure 6:
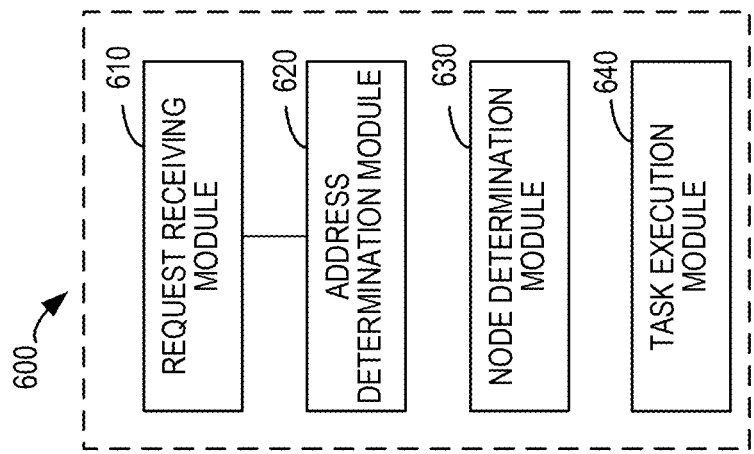
FIG. 6 is a block diagram of an apparatus for data preheating in a CDN according to some embodiments of the present disclosure.

The embodiments of the present disclosure further provide corresponding apparatuses for implementing the above methods or processes. FIG. 6 is a block diagram of an apparatus 600 for data preheating in a CDN according to some embodiments of the present disclosure. The apparatus 600 may be implemented as or included in the preheating system 120. Modules/components in the apparatus 600 may be implemented by hardware, software, firmware, or any combination thereof.

As shown in FIG. 6, the apparatus 600 includes a request receiving module 610 configured to receive a resource request from a service, where the resource request includes a network link corresponding to target data to be preheated of the service. The apparatus 600 further includes an address determination module 620 configured to determine, based on a domain name in the network link, an Internet protocol (IP) address set for the network link from a mapping table of respective regions and IP segments in a global network range of the CDN. The apparatus 600 further includes a node determination module 630 configured to determine, based on the IP address set, a set of service nodes for preheating in the CDN. The apparatus 600 further includes a task execution module 640 configured to execute, in respective service nodes in the set of service nodes, a preheating task for the target data.

In some embodiments, the address determination module 620 is further configured to determine an access validity of the network link; and in response to determining that the network link is valid, determine the IP address set for the network link.

In some embodiments, the apparatus 600 further includes an access control module configured to: in an event where it is determined that the network link is invalid, obtain access control information corresponding to the network link; determine, based on the access control information, whether there is an access control configuration for the network link; and based on a determination of whether there is the access control configuration for the network link, provide prompt information to the service.

In some embodiments, the address determination module 620 is further configured to: perform, by using the network link, a network request for respective IP addresses in the IP address set; in response to a first IP address in the IP address set failing to be successfully requested, delete the first IP address from the IP address set; and in response to a first IP address in the IP address set being successfully requested, keep the first IP address in the IP address set.

In some embodiments, the task execution module 640 is further configured to determine a preheating traffic size based on a size of the target data and a number of IPs in the IP address set; and in response to determining that the preheating traffic size does not exceed a traffic threshold, execute, in the respective service nodes in the set of service nodes, the preheating task for the target data.

In some embodiments, the task execution module 640 is further configured to: in response to determining that the preheating traffic size exceeds the traffic threshold, send traffic prompt information to the service; and in response to receiving a preheating confirmation from the service, execute, in the respective service nodes in the set of service nodes, the preheating task for the target data.

In some embodiments, the task execution module 640 is further configured to: create a plurality of preheating sub-tasks corresponding to the preheating task, where each preheating sub-task corresponds to an IP address in the IP address set, and is configured to execute, at a service node corresponding to the IP address, preheating for the target data; and execute the plurality of preheating sub-tasks.

In some embodiments, the apparatus 600 further includes a state determination module configured to: during execution of the plurality of preheating sub-tasks, maintain a respective execution state corresponding to each of the plurality of preheating sub-tasks, where the execution state is selected from a state set including: a process state, a waiting state, a failure state, and a success state; and determine a state of the preheating task based on the respective execution state corresponding to each of the plurality of preheating sub-tasks.

In some embodiments, the task execution module 640 includes a sub-task execution module configured to: for a given preheating sub-task in the preheating sub-tasks, send a cache request to an IP address corresponding to the given preheating sub-task, to cache the target data at a service node corresponding to the IP address; and in response to completing the caching, set a state corresponding to the IP address to a cache hit state.

In some embodiments, the sub-task execution module includes a request initiating module configured to: in response to a size of the target data exceeding a preset threshold, segment the target data into a plurality of data segments; and send a plurality of cache requests in parallel to the IP address corresponding to the given preheating sub-task, where each cache request instructs to cache one data segment of the plurality of data segments to the service node corresponding to the IP address.

In some embodiments, the request initiating module is further configured to: in an event where a size of the target data exceeds a preset threshold, segment the target data into a plurality of data segments; and perform a plurality of batches of data caching, where in each batch of data caching, a plurality of cache requests are sent in parallel to the IP address corresponding to the given preheating sub-task and an IP address corresponding to at least one other preheating sub-task of the plurality of preheating sub-tasks, and each cache request instructs to cache one data segment of the plurality of data segments to the service node corresponding to the IP address, where in the plurality of batches of data caching, each IP address is cached with different data segments of the plurality of data segments.

The units and/or modules included in the apparatus 600 may be implemented in various ways, including software, hardware, firmware, or any combination thereof. In some embodiments, one or more units and/or modules may be implemented using software and/or firmware, such as machine-executable instructions stored on a storage medium. In addition to or as an alternative to the machine-executable instructions, some or all of the units and/or modules in the apparatus 600 may be implemented, at least partially, by one or more hardware logic components. As an example, rather than a limitation, example types of hardware logic components that may be used include a field programmable gate array (FPGA), an application specific integrated circuit (ASIC), an application specific standard product (ASSP), a system on a chip (SOC), a complex programmable logic device (CPLD), and the like.

Figure 7:
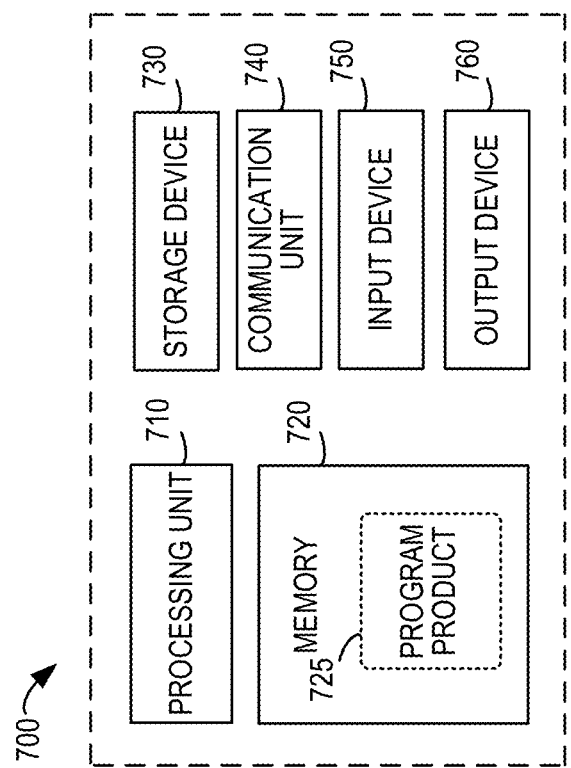
FIG. 7 is a block diagram of an electronic device in which one or more embodiments of the present disclosure can be implemented.

FIG. 7 is a block diagram of an electronic device 700 in which one or more embodiments of the present disclosure can be implemented. It should be understood that the electronic device 700 shown in FIG. 7 is only exemplary, and should not constitute any limitation to the functions and scope of the embodiments described herein. The electronic device 700 shown in FIG. 7 may be used to implement the preheating system 120 in FIG. 1 or the apparatus 600 in FIG. 6.

As shown in FIG. 7, the electronic device 700 is in the form of a general computing device. Components of the electronic device 700 may include, but are not limited to, one or more processors or processing units 710, a memory 720, a storage device 730, one or more communication units 740, one or more input devices 750, and one or more output devices 760. The processing unit 710 may be an actual or virtual processor and can execute various processes according to a program stored in the memory 720. In a multiprocessor system, a plurality of processing units execute computer-executable instructions in parallel to improve the parallel processing capability of the electronic device 700.

The electronic device 700 generally includes multiple computer storage media. Such media may be any available media accessible by the electronic device 700, including but not limited to volatile and non-volatile media, and detachable and non-detachable media. The memory 720 may be a volatile memory (such as a register, a cache, or a random-access memory (RAM)), a non-volatile memory (such as a read-only memory (ROM), an electrically erasable programmable read-only memory (EEPROM), or a flash memory), or a certain combination thereof. The storage device 730 may be a detachable or non-detachable medium, and may include a machine-readable medium, such as a flash drive, a magnetic disk, or any other medium, which may be used to store information and/or data and may be accessed within the electronic device 700.

The electronic device 700 may further include another detachable/non-detachable, volatile/non-volatile storage medium. Although not shown in FIG. 7, a magnetic disk drive for reading or writing from a detachable, non-volatile magnetic disk (for example, a "floppy disk") and an optical disk drive for reading or writing from a detachable, non-volatile optical disk may be provided. In this case, each drive may be connected to a bus (not shown) by one or more data media interfaces. The memory 720 may include a computer program product 725 having one or more program modules configured to perform various methods or actions of various embodiments of the present disclosure.

The communication unit 740 implements communication with other electronic devices through a communication medium. Additionally, the functions of the components of the electronic device 700 may be implemented in a single computing cluster or multiple computing machines that can communicate through communication connections. Therefore, the electronic device 700 may operate in a networked environment using a logical connection with one or more other servers, network personal computers (PCs) or another network node.

The input device 750 may be one or more input devices, such as a mouse, a keyboard, a trackball, etc. The output device 760 may be one or more output devices, such as a display, a speaker, a printer, etc. The electronic device 700 may also communicate with one or more external devices (not shown) through the communication unit 740 as required, the external devices such as a storage device, a display device, etc., communicate with one or more devices that enable a user to interact with the electronic device 700, or communicate with any device (for example, a network card, a modem, etc.) that enables the electronic device 700 to communicate with one or more other electronic devices. Such communication may be performed via an input/output (I/O) interface (not shown).

According to an example implementation of the present disclosure, a computer-readable storage medium is provided, on which computer-executable instructions are stored, where the computer-executable instructions are executed by a processor to implement the above-described methods. According to an example implementation of the present disclosure, a computer program product is further provided. The computer program product is physically stored on a non-transitory computer-readable medium and includes computer-executable instructions, and the computer-executable instructions are executed by a processor to implement the above-described methods.

Various aspects of the present disclosure are described herein with reference to the flowcharts and/or block diagrams of the methods, apparatuses, devices, and computer program products implemented according to the present disclosure. It should be understood that each block in the flowcharts and/or block diagrams and the combinations of the blocks in the flowcharts and/or block diagrams may be implemented by computer-readable program instructions.

The computer-readable program instructions may be provided to a processing unit of a general-purpose computer, a special-purpose computer, or other programmable data processing apparatus, so as to produce a machine, so that these instructions, when executed by the processing unit of the computer or other programmable data processing apparatus, produce an apparatus for implementing the functions/actions specified in one or more of the blocks in the flowcharts and/or block diagrams. These computer-readable program instructions may also be stored in a computer-readable storage medium. These instructions cause the computer, the programmable data processing apparatus, and/or other devices to work in a specific manner. Therefore, the computer-readable medium in which the instructions are stored includes an article of manufacture, which includes instructions for implementing various aspects of the functions/actions specified in one or more of the blocks in the flowcharts and/or block diagrams.

The computer-readable program instructions may be loaded onto a computer, other programmable data processing apparatus, or other device, causing a series of operational steps to be performed on the computer, the other programmable data processing apparatus, or the other device to generate a computer-implemented process, such that the instructions executed on the computer, the other programmable data processing apparatus, or the other device implement the functions/actions specified in one or more of the blocks in the flowcharts and/or block diagrams.

The flowcharts and block diagrams in the drawings show the architecture, functionality, and operation of possible implementations of systems, methods, and computer program products according to multiple implementations of the present disclosure. In this regard, each block in the flowcharts or block diagrams may represent a module, a program segment, or a portion of an instruction, and the module, the program segment, or the portion of the instruction contains one or more executable instructions for implementing the specified logical function. In some alternative implementations, the functions noted in the blocks may also occur in a different order than the order noted in the drawings. For example, two consecutive blocks may, in fact, be executed substantially in parallel, or the blocks may sometimes be executed in a reverse order, depending on the functionality involved. It should also be noted that each block in the block diagrams and/or flowcharts and combinations of blocks in the block diagrams and/or flowcharts may be implemented by a dedicated hardware-based system that performs the specified functions or actions, or may be implemented by a combination of dedicated hardware and computer instructions.

Various implementations of the present disclosure have been described above, and the above description is exemplary and not exhaustive, and is not limited to the disclosed implementations. Many modifications and variations are obvious to those of ordinary skill in the art without departing from the scope and spirit of the described implementations. The selection of terms used herein is intended to best explain the principles of the implementations, the practical application, or the improvement of the technology in the market, or to enable other ordinary skilled in the art to understand the implementations disclosed herein.

The invention claimed is:

1. A data preheating method used in a content delivery network, CDN, characterized by comprising:
    receiving a resource request from a service, wherein the resource request comprises a network link corresponding to target data to be preheated of the service;
    determining, based on a domain name in the network link, an Internet protocol, IP, address set for the network link from a mapping table of respective regions and IP segments in a global network range of the CDN;
    determining, based on the IP address set, a set of edge nodes for preheating in the CDN; and executing, in respective edge nodes in the set of edge nodes, a preheating task for the target data, wherein executing the preheating task for the target data comprises:
    segmenting the target data into a plurality of data segments; and
    performing a plurality of batches of data caching for the target data, wherein in each batch of data caching, a plurality of cache requests are sent in parallel to an IP address corresponding to a given preheating sub-task of a plurality of preheating sub-tasks of the preheating task and an IP address corresponding to at least one other preheating sub-task of the plurality of preheating sub-tasks, and each cache request instructs to cache one data segment of the plurality of data segments to an edge node corresponding to the IP address, wherein in the plurality of batches of data caching, each IP address is cached with different data segments of the plurality of data segments; and
wherein a mode of merged source returning is used for preheating of a data link layer node and a network layer node.

2. The method according to claim 1, wherein determining the IP address set for the network link comprises:
determining an access validity of the network link; and
in response to determining that the network link is valid, determining the IP address set for the network link.

3. The method according to claim 1, further comprising:
in response to determining that the network link is invalid, obtaining access control information corresponding to the network link;
determining, based on the access control information, whether there is an access control configuration for the network link; and
based on a determination of whether there is the access control configuration for the network link, providing prompt information to the service.

4. The method according to claim 1, wherein determining the IP address set for the network link comprises:
executing, by using the network link, a network request for respective IP addresses in the IP address set;
in response to a first IP address in the IP address set failing to be successfully requested, deleting the first IP address from the IP address set; and
in response to a first IP address in the IP address set being successfully requested, keeping the first IP address in the IP address set.

5. The method according to claim 1, wherein executing, in the respective edge nodes in the set of edge nodes, the preheating task for the target data comprises:
determining a preheating traffic size based on a size of the target data and a number of IPs in the IP address set; and
in response to determining that the preheating traffic size does not exceed a traffic threshold, executing, in the respective edge nodes in the set of edge nodes, the preheating task for the target data.

6. The method according to claim 5, wherein executing, in the respective edge nodes in the set of edge nodes, the preheating task for the target data comprises:
in response to determining that the preheating traffic size exceeds the traffic threshold, sending traffic prompt information to the service; and
in response to receiving a preheating confirmation from the service, executing, in the respective edge nodes in the set of edge nodes, the preheating task for the target data.

7. The method according to claim 1, wherein executing, in the respective edge nodes in the set of edge nodes, the preheating task for the target data comprises:
creating the plurality of preheating sub-tasks corresponding to the preheating task, wherein each preheating sub-task corresponds to an IP address in the IP address set, and is configured to execute, at an edge node corresponding to the IP address, preheating for the target data; and
executing the plurality of preheating sub-tasks.

8. The method according to claim 7, further comprising:
maintaining, during execution of the plurality of preheating sub-tasks, a respective execution state corresponding to each of the plurality of preheating sub-tasks, wherein the execution state is selected from a state set comprising: an process state, a waiting state, a failure state, and a success state; and
determining a state of the preheating task based on the respective execution state corresponding to each of the plurality of preheating sub-tasks.

9. The method according to claim 7, wherein executing the plurality of preheating sub-tasks comprises:
for a given preheating sub-task in the preheating sub-tasks, sending a cache request to an IP address corresponding to the given preheating sub-task, to cache the target data at a service node corresponding to the IP address; and
in response to completing the caching, setting a state corresponding to the IP address to a cache hit state.

10. The method according to claim 9, wherein sending the cache request to the IP address corresponding to the given preheating sub-task comprises:
in response to a size of the target data exceeding a preset threshold, segmenting the target data into a plurality of data segments; and
sending a plurality of cache requests in parallel to the IP address corresponding to the given preheating sub-task, wherein each cache request instructs to cache one data segment of the plurality of data segments to the service node corresponding to the IP address.

11. The method according to claim 9, wherein segmenting the target data into the plurality of data segments comprises:
in response to a size of the target data exceeding a preset threshold, segmenting the target data into the plurality of data segments.

12. An electronic device, comprising:
at least one processing unit; and
at least one memory coupled to the at least one processing unit and storing instructions executable by the at least one processing unit, wherein the instructions, when executed by the at least one processing unit, cause the electronic device to perform acts comprising:
    receiving a resource request from a service, wherein the resource request comprises a network link corresponding to target data to be preheated of the service;
    determining, based on a domain name in the network link, an Internet protocol, IP, address set for the network link from a mapping table of respective regions and IP segments in a global network range of a content delivery network, CDN;
    determining, based on the IP address set, a set of edge nodes for preheating in the CDN; and
    executing, in respective edge nodes in the set of edge nodes, a preheating task for the target data, wherein executing the preheating task for the target data comprises:

segmenting the target data into a plurality of data segments; and performing a plurality of batches of data caching for the target data, wherein in each batch of data caching, a plurality of cache requests are sent in parallel to an IP address corresponding to a given preheating sub-task of a plurality of preheating sub-tasks of the preheating task and an IP address corresponding to at least one other preheating sub-task of the plurality of preheating sub-tasks, and each cache request instructs to cache one data segment of the plurality of data segments to an edge node corresponding to the IP address, wherein in the plurality of batches of data caching, each IP address is cached with different data segments of the plurality of data segments; and wherein a mode of merged source returning is used for preheating of a data link layer node and a network layer node.

13. The device according to claim 12, wherein determining the IP address set for the network link comprises:
determining an access validity of the network link; and
in response to determining that the network link is valid, determining the IP address set for the network link.

14. The device according to claim 12, the acts further comprising:
in response to determining that the network link is invalid, obtaining access control information corresponding to the network link;
determining, based on the access control information, whether there is an access control configuration for the network link; and
based on a determination of whether there is the access control configuration for the network link, providing prompt information to the service.

15. The device according to claim 12, wherein determining the IP address set for the network link comprises:
executing, by using the network link, a network request for respective IP addresses in the IP address set;
in response to determining a first IP address in the IP address set fails to be successfully requested, deleting the first IP address from the IP address set; and
in response to determining a first IP address in the IP address set is successfully requested, keeping the first IP address in the IP address set.

16. The device according to claim 12, wherein executing, in the respective edge nodes in the set of edge nodes, the preheating task for the target data comprises:
determining a preheating traffic size based on a size of the target data and a number of IPs in the IP address set; and
in response to determining that the preheating traffic size does not exceed a traffic threshold, executing, in the respective edge nodes in the set of edge nodes, the preheating task for the target data.

17. The device according to claim 16, wherein executing, in the respective edge nodes in the set of edge nodes, the preheating task for the target data comprises:
in response to determining that the preheating traffic size exceeds the traffic threshold, sending traffic prompt information to the service; and in response to receiving a preheating confirmation from the service, executing, in the respective edge nodes in the set of edge nodes, the preheating task for the target data.

18. The device according to claim 12, wherein executing, in the respective edge nodes in the set of edge nodes, the preheating task for the target data comprises:
creating a plurality of preheating sub-tasks corresponding to the preheating task, wherein each preheating sub-task corresponds to an IP address in the IP address set, and is configured to execute, at an edge node corresponding to the IP address, preheating for the target data; and
executing the plurality of preheating sub-tasks.

19. The device according to claim 18, the acts further comprising:
maintaining, during execution of the plurality of preheating sub-tasks, a respective execution state corresponding to each of the plurality of preheating sub-tasks, wherein the execution state is selected from a state set comprising: an process state, a waiting state, a failure state, and a success state; and
determining a state of the preheating task based on the respective execution state corresponding to each of the plurality of preheating sub-tasks.

20. A non-transitory computer-readable storage medium storing a computer program thereon, wherein the computer program is executable by a processor to implement a method used in a content delivery network, CDN, the method comprising:
receiving a resource request from a service, wherein the resource request comprises a network link corresponding to target data to be preheated of the service;
determining, based on a domain name in the network link, an Internet protocol, IP, address set for the network link from a mapping table of respective regions and IP segments in a global network range of the CDN;
determining, based on the IP address set, a set of edge nodes for preheating in the CDN; and
executing, in respective edge nodes in the set of edge nodes, a preheating task for the target data, wherein executing the preheating task for the target data comprises:
segmenting the target data into a plurality of data segments; and
performing a plurality of batches of data caching for the target data, wherein in each batch of data caching, a plurality of cache requests are sent in parallel to an IP address corresponding to a given preheating sub-task of a plurality of preheating sub-tasks of the preheating task and an IP address corresponding to at least one other preheating sub-task of the plurality of preheating sub-tasks, and each cache request instructs to cache one data segment of the plurality of data segments to an edge node corresponding to the IP address, wherein in the plurality of batches of data caching, each IP address is cached with different data segments of the plurality of data segments; and
wherein a mode of merged source returning is used for preheating of a data link layer node and a network layer node.

* * * * *